Dec. 27, 1955  R. B. FULTON ET AL  2,728,182
ELECTRIC LAWN MOWER WITH AUTOMATIC REEL
Filed Jan. 9, 1953  2 Sheets-Sheet 1
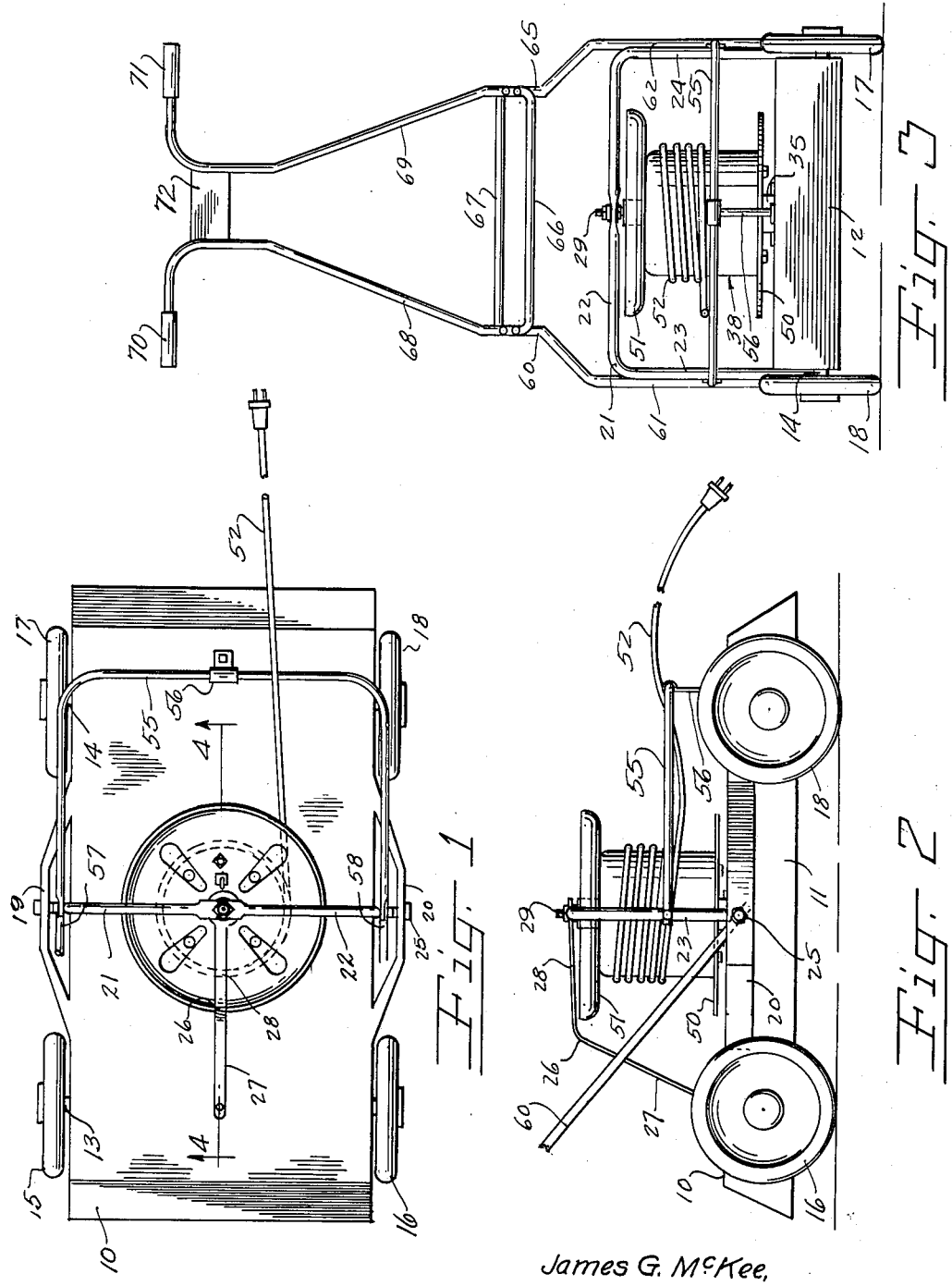
James G. McKee,
Roy B. Fulton,  INVENTORS
Frank W. Norris,
BY
McMorrow, Berman + Davidson
ATTORNEYS.

Dec. 27, 1955  R. B. FULTON ET AL  2,728,182
ELECTRIC LAWN MOWER WITH AUTOMATIC REEL
Filed Jan. 9, 1953  2 Sheets-Sheet 2

James G. McKee,
Roy B. Fulton,   INVENTORS
Frank W. Norris,
BY

McMorrow, Berman + Davidson
ATTORNEYS

United States Patent Office 2,728,182
Patented Dec. 27, 1955

2,728,182
ELECTRIC LAWN MOWER WITH AUTOMATIC REEL

Roy B. Fulton, James G. McKee and Frank W. Norris, Greenville, Miss.

Application January 9, 1953, Serial No. 330,514

7 Claims. (Cl. 56—25.4)

This invention relates to motor driven mobile devices, such as lawn mowers and more particularly to a mobile device having an electric driving motor and an extension cord wherein the motor constitutes a reel on which the extension cord is wound by the torque reaction of the motor.

It is among the objects of the invention to provide an improved mobile device, such as a power lawn mower, having an electric motor and a long extension cord with the extension cord wound on the motor as a reel by the torque reaction of the motor; which includes flange means at the opposite ends of the motor to maintain the wound portion of the extension cord on the motor; which has an extension cord of sufficient strength to withstand the torque reaction force of the motor with a reasonable factor of safety; which has air reaction elements driven by the motor to create sufficient torque reaction to rewind the extension cord when the motor is running but the mobile device is not functioning for its intended purpose, such as cutting grass; and which is simple and durable in construction, economical to manufacture, and positive and efficient in operation.

Other objects and advantages will become apparent from a consideration of the following description and the appended claims in conjunction with the accompanying drawings, wherein:

Figure 1 is a top plan view of a mobile device illustrative of the invention;

Figure 2 is a side elevation view of the device illustrated in Figure 1;

Figure 3 is an end elevational view of the device;

Figure 4:
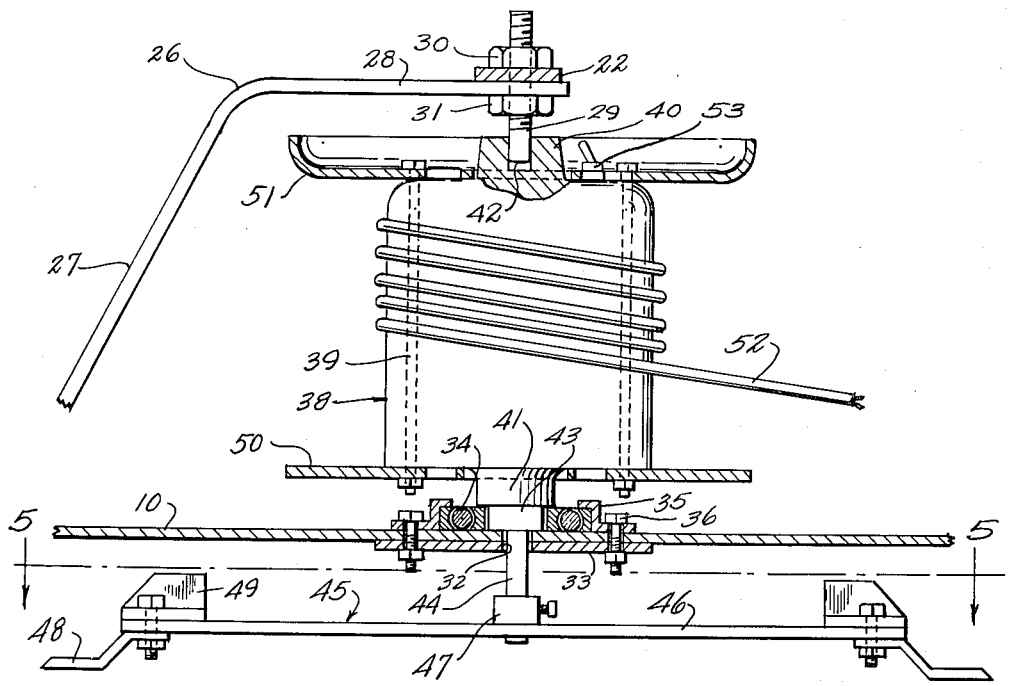
Figure 4 is a fragmentary cross sectional view on an enlarged scale on the line 4—4 of Figure 1.
Figure 5:
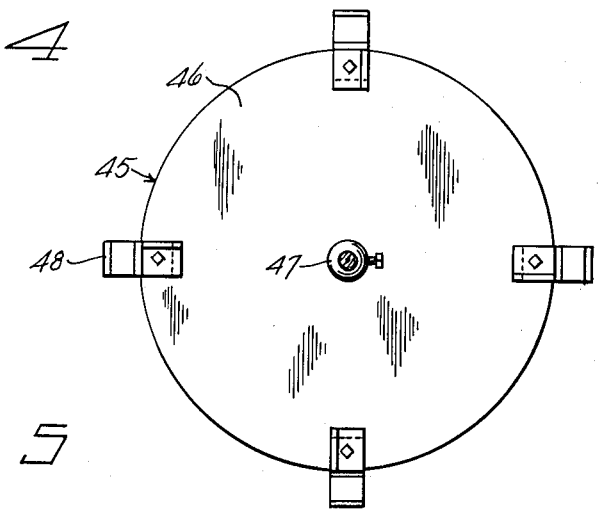
Figure 5 is a fragmentary cross sectional view on the line 5—5 of Figure 4.

With continued reference to the drawings, the mobile device illustrated is an electric driven rotary lawn mower and has a frame including a platform 10 of elongated, rectangular shape which is flat and substantially horizontally disposed when the mower is in operative position. Side flanges, as illustrated in Figure 2 and indicated at 11, extend downwardly one from each longitudinal edge of the platform 10 in spaced apart and substantially parallel relationship to each other and end flanges, as indicated at 12 in Figure 3, extend downwardly and outwardly one from each end edge of the platform and are disposed substantially perpendicular to the side flanges 11. Axles 13 and 14 extend through and are journaled in suitable bearing apertures in the side flanges 11 and are disposed below and transversely of the platform 10 inwardly of and one adjacent each of the end flanges 12. Wheels 15 and 16 are mounted on the axle 13 one at each end of the axle and spaced from the outer sides of the corresponding side flanges 11 of the platform and similar wheels 17 and 18 are mounted on the axle 14 one at each end of this axle and spaced from the outer sides of the corresponding side flanges so that the platform is supported on four wheels disposed one near each corner of the rectangular platform.

A strap 19 is secured to the side flange 11 adjacent and between the wheels 15 and 17 and is secured at its ends to the side flange with its intermediate portion spaced from the side flange adjacent the midlength location of the platform and a similar strap 20 is secured to the side flange adjacent the wheels 16 and 18 and secured at its ends to the side flange between these wheels with its intermediate portion spaced from the side flange adjacent the midlength location of the platform. A U-shaped wicket 21 extends perpendicularly upwardly from the platform at the midlength location of the platform and has an intermediate portion 22 extending transversely of the platform above and substantially parallel to the platform and legs 23 and 24 extending perpendicularly downwardly from the respectively opposite ends of the intermediate portion 22 and received at their ends remote from the intermediate portion within the straps 19 and 20 respectively. The ends of these legs are secured to the platform by bolts, as indicated at 25, extending through registering apertures in the straps 19 and 20 and the adjacent side flanges 11 and in the corresponding wicket legs near the distal ends of these legs.

An angle brace 26 is secured at one end to the platform 10 medially of the width of the platform and adjacent the axle 13 and has one leg 27 extending upwardly from the platform and a second leg 28 extending from the upper end of the leg 27 above and substantially parallel to the platform and connected at its distal end to the intermediate portion 22 of the wicket 21 at the midlength location of this intermediate portion. The wicket 21 and brace 26 are provided with registering apertures and a journal pin 29 extends through these apertures and is secured in position by clamp nuts 30 and 31 threaded onto the screw threaded journal pin and disposed at the upper side of the wicket intermediate portion 22 and the underside of the brace leg 28 respectively clamping the wicket and brace together and securing the journal pin in position relative thereto.

The platform 10 is provided with a centrally disposed aperture 32 and a reinforcing plate 33 is disposed below the central portion of the platform and provided with an aperture registering with the aperture 32. A ball bearing 34 is disposed on the upper side of the platform 10 circumstantially surrounding the aperture 32 and is held on the platform by an annular flanged cage 35 which engages the outer race of the ball bearing and is secured to the platform by bolts 36 which extend through registering apertures in a flange of the cage, in the platform 10 and in the reinforcing plate 33 at angular intervals around the cage.

An electric motor, generally indicated at 38, is mounted on the platform 10 and has a housing 39 provided with outwardly extending coaxial bosses 40 and 41 one at each end thereof. The boss 40 is provided with a coaxial recess 42 which receives the lower end portion of the journal pin 29 and the boss 41 is provided with an outer end portion 43 of reduced diameter received in the inner race of the bearing 34, the motor being rotatably supported on the platform 10 with the rotational axis of its shaft 44 substantially perpendicular to the platform.

The motor shaft 44 extends from the motor housing downwardly through the aperture 32 in the platform and the registering aperture in the reinforcing plate 33 and a cutter, generally indicated at 45, is mounted on the lower end of the motor shaft.

In the lawn mower illustrated this cutter 45 comprises a circular disc 46 having a central hollow boss 47 receiving and secured to the lower end of the motor shaft so that the disc is disposed substantially perpendicular to the rotational axis of the shaft, and cutting blades 48 projecting radially outwardly from the peripheral edge of the disc at equal angular intervals around the disc. Vanes 49 are mounted on the disc 46 one above each of the cutting blades 48 and extend perpendicularly upwardly from the disc to provide an air reaction to rotation of the disc so that there will be some torque reaction to rotation of the cutter 45 by the motor even when the cutter is not engaged with grass to be cut.

A centrally apertured flat plate 50 of circular shape is mounted on the bottom end of the motor housing 39 and extends marginally outwardly of the motor housing to provide a bottom flange and a centrally apertured, dish-shaped plate 51 is coaxially mounted on the top end of the motor housing and extends marginally outwardly of the motor housing to provide a top flange, this dish-shaped plate 51 having its open side remote from the adjacent end of the motor housing. The two plates 50 and 51 together with the motor housing 39 constitute a reel for winding an extension cord and a long extension cord 52 is connected at one end to the motor through a motor control switch 53 and is wound on the motor housing between the flange plates 50 and 51.

A U-shaped guard rail 55 is supported above and substantially parallel to the platform 10 at the side of the motor remote from the brace 26 by a bracket 56 disposed substantially perpendicular to the platform medially of the width of the platform with its lower end secured to the platform and its upper end secured to the intermediate portion of the guard rail and by connections 57 and 58 between the ends of the guard rail and the wicket legs 23 and 24 respectively.

A U-shaped handle bar fork 60 is pivotally connected at the distal ends of its legs 61 and 62 to the bolts 25 which connect the distal ends of the wicket legs 23 and 24 to the side flanges 11 of the platform, the fork legs 61 and 62 being longer than the wicket legs 23 and 24, as illustrated in Figure 3.

A U-shaped handle bar structure 65 is secured at its closed end to the fork 60 at the closed end of the fork with the intermediate portion 66 of the structure 65 spaced from and substantially parallel to the intermediate portion 67 of the fork 60 and the legs 68 and 69 of the structure 60 extending away from the corresponding fork legs 61 and 62 with the longitudinal center lines of the fork 60 and handle bar structure 65 substantially parallel to a common plane. At the open end of the structure 65 the legs 68 and 69 thereof are deflected outwardly away from each other to constitute a handle bar and are provided with hand grips 70 and 71 respectively. A brace bar 72 extends between and is secured to the legs 68 and 69 near the open end of the structure 65.

With this arrangement the entire motor 38 is free to rotate about an axis perpendicular to the platform 10 and is held from rotation in response to the torque reaction incident to driving the cutter 45 only by the tangented pull of the extension cord 52 on the motor housing. This reaction torque keeps any free portion of the extension cord wound tightly about the motor housing and the top and bottom end flanges 51 and 50 keep the cord from running off of the ends of the motor housing. The guide rail 55 is effective to guide the extension cord onto the housing between the end flanges 51 and 50.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the range of equivalency of the claims are, therefore, intended to be embraced therein.

What is claimed is:

1. In a power operated mobile device having a frame, an electric motor rotatably mounted on said frame, a rotary cutter mounted on said motor and driven thereby, and an extension cord connected at one end to said motor and wound around said motor by the torque reaction of said motor to drive said cutter, whereby said motor serves as a winding reel for said cord.

2. In a power operated mobile device having a frame, an electric motor rotatably mounted on said frame, a rotary cutter mounted on said motor and driven thereby, means mounted on said motor providing annular flanges one at each end of said motor, and a motor extension cord connected at one end to said motor and wound around said motor between said flanges by the torque reaction of said motor to drive said cutter whereby said motor and said flanges serve as a winding reel for said extension cord.

3. In a mobile device having a wheel supported platform provided with an aperture, a motor having a housing disposed above said platform and a shaft extending through said aperture, a rotary cutter mounted on said motor shaft below said platform, means mounting said motor housing on said platform for free rotation about an axis substantially perpendicular to said platform, means mounted on said motor housing providing annular flanges one at each end of said housing, and a motor extension cord connected at one end to said motor housing and wound around said housing between said flanges by the torque reaction exerted on said motor incident to driving said cutter.

4. In a mobile device having a wheel supported platform provided with an aperture, a motor having a housing disposed above said platform and a shaft extending through said aperture, a rotary cutter mounted on said motor shaft below said platform, means mounting said motor housing on said platform for free rotation about an axis substantially perpendicular to said platform, means mounted on said motor housing providing annular flanges one at each end of said housing, a motor extension cord connected at one end to said motor housing and wound around said housing between said flanges by the torque reaction exerted on said motor incident to driving said cutter, and air reaction vanes mounted on said cutter.

5. In a power mower the combination, with a horizontal platform including a set of ground wheels supporting the platform for movement over a ground surface, of a vertically positioned motor rotatably mounted upon and projecting upwardly from said platform, said motor including a casing disposed above the platform and a shaft extending below the platform, cutter means connected to said shaft for rotation thereby in a horizontal plane below said platform, vanes on the cutter means disposed transversely of the plane of rotation of the cutter means for imparting a torque reaction to said motor tending to rotate the casing in one direction independently of rotation of the ground wheels, and an electric cord leading to the motor for supplying power thereto and having a motor-adjacent end portion engaged with the casing against movement circumferentially of the casing, for winding of the cord upon the casing responsive to rotatable movement of the casing in said direction.

6. In a power mower, the combination, with a horizontal platform including a set of ground wheels supporting the platform for movement over a ground surface, of a horizontally disposed bearing assembly mounted on said platform, a motor rotatably mounted upon and projecting upwardly from said assembly, said motor including a casing disposed above the platform and a shaft extending below the platform through the bearing assembly, the casing including an axially extending boss at one end supported by the bearing assembly and elevating the casing out of contact with the platform, cutter means connected to said shaft for rotation thereby in a horizontal plane below said platform, vanes on the cutter means disposed transversely of the plane of rotation of the cutter means for imparting a torque reaction to said motor tending to rotate the casing in one direction independently of rotation of the ground wheels, an electric cord leading to the motor for supplying power thereto and having a motor-adjacent end portion engaged with the casing against movement circumferentially of the casing, for winding of the cord upon the casing responsive to rotatable movement of the casing in said direction, and upper and lower end flanges fixed to the respective ends of the casing to confine the wound cord therebetween, the lower flange being spaced above the platform by said bearing assembly and boss.

7. In a power mower, the combination, with a horizontal platform including a set of ground wheels supporting the platform for movement over a ground surface, of a horizontally disposed bearing assembly mounted on said platform, a motor rotatably mounted upon and projecting upwardly from said assembly, said motor including a casing disposed above the platform and a shaft extending below the platform through the bearing assembly, the casing including an axially extending boss at one end supported by the bearing assembly and elevating the casing out of contact with the platform, cutter means connected to said shaft for rotation thereby in a horizontal plane below said platform, vanes on the cutter means disposed transversely of the plane of rotation of the cutter means for imparting a torque reaction to said motor tending to rotate the casing in one direction independently of rotation of the ground wheels, an electric cord leading to the motor for supplying power thereto and having a motor-adjacent end portion engaged with the casing against movement circumferentially of the casing, for winding of the cord upon the casing responsive to rotatable movement of the casing in said direction, upper and lower end flanges fixed to the respective ends of the casing to confine the wound cord therebetween, the lower flange being spaced above the platform by said bearing assembly and boss, and means to hold the motor against deviation from its vertical position during rotation thereof, comprising a wicket of inverted U-shape having legs secured to opposite sides of the platform and a bight formed with a center opening aligned with the axis of rotation of the motor, an angle brace fixed at one end to the platform and having its other end formed with an opening registered with the opening of the wicket bight, and a journal pin extending through the openings of the wicket and brace and coaxially aligned with the motor, said casing having an axial recess at said other end thereof in which said pin is engaged.

References Cited in the file of this patent

UNITED STATES PATENTS

| | | |
|---|---|---|
| 1,802,358 | Smith | Apr. 28, 1931 |
| 2,498,609 | Reil | Feb. 21, 1950 |
| 2,559,897 | Phelps | July 10, 1951 |
| 2,630,665 | Lauer | Mar. 10, 1953 |